(12) United States Patent
Elam et al.

(10) Patent No.: US 8,741,800 B2
(45) Date of Patent: Jun. 3, 2014

(54) HYDROTHERMAL PERFORMANCE OF CATALYST SUPPORTS

(75) Inventors: Jeffrey W. Elam, Elmhurst, IL (US); Christopher L. Marshall, Naperville, IL (US); Joseph A. Libera, Clarendon Hills, IL (US); James A. Dumesic, Verona, WI (US); Yomaira J. Pagan-Torres, Madison, WI (US)

(73) Assignee: UChicago Argonne, LLC, Chicago, IL (US)

( * ) Notice: Subject to any disclaimer, the term of this patent is extended or adjusted under 35 U.S.C. 154(b) by 91 days.

(21) Appl. No.: 12/841,805

(22) Filed: Jul. 22, 2010

(65) Prior Publication Data

US 2012/0021898 A1  Jan. 26, 2012

(51) Int. Cl.
*B01J 23/00* (2006.01)
*B01J 27/02* (2006.01)
*B01J 27/24* (2006.01)
*C23C 16/00* (2006.01)
*C23C 16/06* (2006.01)
*C23C 16/22* (2006.01)
*C23C 16/40* (2006.01)

(52) U.S. Cl.
USPC ........... 502/216; 502/200; 502/349; 502/350; 502/353; 427/255.11; 427/255.19; 427/255.25; 427/255.28; 427/255.31; 427/255.36; 427/255.394; 427/255.395

(58) Field of Classification Search
USPC ............. 502/200, 216, 349, 350, 353; 427/255.11, 255.19, 255.25, 255.28, 427/255.31, 255.36, 255.394, 255.395
See application file for complete search history.

(56) References Cited

U.S. PATENT DOCUMENTS 7,713,907 B2 * 5/2010 Elam et al. ............... 502/263
7,972,569 B2 * 7/2011 Elam et al. ............... 422/211

OTHER PUBLICATIONS

"Improved hydrothermal stability of niobia-supported Pd catalysts," Hien N. Pham et al. Applied Catalysis A: General 397 (2011), pp. 153-162.*
"Atomic layer deposition of TiO2 on mesoporous silica," Shannon Mahurin et al. Journal of Non-Crystalline Solids 352 (2006), pp. 3280-3284.*

* cited by examiner

*Primary Examiner* — Patricia L Hailey
(74) *Attorney, Agent, or Firm* — Foley & Lardner LLP

(57) ABSTRACT

A high surface area catalyst with a mesoporous support structure and a thin conformal coating over the surface of the support structure. The high surface area catalyst support is adapted for carrying out a reaction in a reaction environment where the thin conformal coating protects the support structure within the reaction environment. In various embodiments, the support structure is a mesoporous silica catalytic support and the thin conformal coating comprises a layer of metal oxide resistant to the reaction environment which may be a hydrothermal environment.

9 Claims, 7 Drawing Sheets

1

HYDROTHERMAL PERFORMANCE OF CATALYST SUPPORTS

STATEMENT OF GOVERNMENT INTEREST

The United States Government has rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

FIELD OF THE INVENTION

This invention relates to catalysts supports and the treatment of catalysts supports. More specifically this invention relates to catalyst systems and methods for the treatment of catalyst support systems to mitigate structural degradation and the reduction in the surface area of such catalyst supports operating under hydrothermal and other hostile reaction conditions.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many industrially relevant catalytic reactions are performed under hydrothermal conditions. For instance, catalytic reactions may be carried out at elevated temperatures (e.g., 200° C.) and pressures (e.g., 400 psi) in the presence of water or steam. Under these extreme conditions, conventional high surface area catalytic support structures such as various mesoporous materials, including mesoporous silica materials MCM-41 and SBA-15, become severely degraded. As such, the surface area of such catalytic supports can drop by a factor of 10, which results in severely diminished catalytic activity and can result in the collapse of the catalytic support structure, loss or dissolution of the catalytically active material, and failure of the catalyst. In less extreme situations, catalytic activity may nonetheless decrease, impacting reaction yield, which may require frequent replacement and maintenance of the catalysts.

Because many catalytic reactions for bio-processing, for example, rely on mesoporous catalytic material supports, there is a need to develop a commercially viable catalyst that is structurally robust and demonstrates long-term catalytic performance under hydrothermal conditions and other reaction environments that are hostile to catalyst support structures.

SUMMARY

The present invention provides catalytic support systems and methods for forming such systems, which may be used in various reactions and exhibit improved long-term catalytic performance under hydrothermal conditions. Preserving the surface area of the catalytic support system during a reaction maintains the structural integrity of the catalyst support, which directly relates to the catalytic activity of the system over the period of the reaction and/or life of the catalyst. Improved catalyst support structural performance is accomplished by forming a thin conformal coating of a material on the high surface area catalytic support structure. Although the conformal coating may be very thin, several monolayers of material, for instance 0.1 to 1.2 nm, the conformal coating protects the catalytic support from degradation within the reaction environment.

A variety of thin conformal coatings may be applied to various high surface area catalytic supports to improve long-term catalytic performance of the catalyst system. For example, the thin conformal coating may comprise materials that are themselves catalytically active or that enhance or promote the reactivity of a second catalytically active material in contact with the coating. Alternatively, a thin conformal coating may be selected purely for its structurally enhancing properties in relating to the catalytic support. In these embodiments, one or more thin coatings that are selected for their catalytic activity may then be deposited over the first coating to complete the catalyst system. Furthermore, active catalytic materials comprised of nanoparticles, clusters, or monoatomic species can be applied over the thin film coating or coatings to complete the catalyst system.

A number of desirable catalytic support materials are characterized by a high surface area which results from numerous small pores that permeate the support material. These pores are typically defined by a long pore length (L) in relation to a relatively small pore diameter (d) so as to possess a high aspect ratio L/d. Accordingly, achieving a protective conformal coating on a high surface area, high aspect ratio catalytic support material such as a mesoporous silica substrate requires a deposition process that is capable of infiltrating the porous surface with the coating material in order to form an effective and substantially conformal coating. Moreover, to maintain the high surface area of the catalytic support material, it is preferred that the conformal coating be thin to substantially maintain pore diameter and pore volume. Still further, from a practical standpoint of manufacturing conformally coated catalytic support materials, it is desirable to deposit the conformal coating relatively quickly to avoid long processing times.

The present invention uses atomic layer deposition (ALD) to deposit the conformal coating on high surface area catalytic supports. ALD can be used to produce very thin coatings less than one atomic monolayer in thickness of various structurally enhancing and/or catalytically active materials. ALD is particularly well suited for obtaining high penetration along the pore length of the high aspect ratio pores within high surface area catalytic support substrates. Relative to other deposition processes, including chemical vapor deposition (CVD), ALD can produce a highly conformal coating in substrates such as high surface area catalytic supports. ALD can also produce well formed conformal coatings with greater speed relative to other deposition processes, including CVD.

A variety of catalytically active materials that demonstrate long term robustness in response to catalytic reaction environments may be produced using an ALD process. ALD applies a thin conformal film of these materials to the desired film thickness over the entire surface of a high surface area support substrate. For example, a chemically robust material such as niobium oxide ($Nb_2O_5$) can be deposited on a mesoporous silica support such as MCM-41 or SBA-15. Niobium oxide is chemically more robust and more resistant to attack under hydrothermal conditions and by components within the reaction environment relative to the mesoporous silica support. Thus, a thin layer of a niobium oxide coating, for example 4-30 monolayers, protects the structure of the catalyst support from attack so that the high surface area and porosity of the support are substantially maintained over the course of the reaction. Accordingly, catalytic activity of the system is also preserved. The ALD coating process can also be used to deposit a thin layer of zirconium oxide ($ZrO_2$) on SBA-15 or a thin layer of titanium oxide ($TiO_2$) on SBA-15. Additionally, the process may be generalized to other coating materials, in particular other transition metal oxides and other catalyst support materials substrates. Furthermore, ALD can be used to produce other chemically robust and/or catalytically active support layers including metal nitrides, and metal sulfides.

In one embodiment, a catalyst system that demonstrates improved structural integrity in response to a reaction environment, comprises a high surface area mesoporous catalytic support structure that has a plurality of pores, and which is susceptible to surface area loss within the reaction environment. The system includes a thin conformal layer that comprises at least one metal oxide that substantially coats the surface of the support structure. The metal oxide is characterized by a catalytic activity to carry out the reaction and a chemical resistance to the reaction environment greater than the support structure. The thin conformal layer substantially maintains the surface area of the catalyst system within the reaction environment over the duration of the reaction period.

In another embodiment, a method for preparing a structurally robust high surface area catalyst system for carrying out a reaction in an environment detrimental to the structural integrity of a catalytic support structure comprises providing an atomic layer deposition (ALD) reactor, providing a catalyst substrate that comprises a high surface area mesoporous catalytic support structure with a plurality of pores, providing a first precursor that includes at least one metal, and providing a second precursor that includes oxygen. The method further comprises depositing a protective conformal layer that substantially coats the catalyst substrate and comprises at least one metal oxide characterized by a catalytic activity to carry out the reaction and a resistance to the reaction environment greater than the support structure. The protective conformal layer is deposited by performing a plurality of ALD cycles using the ALD reactor. The resulting protective conformal layer substantially maintains the surface area of the catalyst system within the reaction environment over the duration of the reaction.

In still a further embodiment, a high surface area catalyst support with improved performance in a hydrothermal reaction environment comprises a mesoporous silica support substrate with a plurality of pores and a surface area of between about 100 $m^2$/gram and 1,000 $m^2$/gram and a protective conformal coating that comprises from about 1 to about 30 monolayers of at least one metal oxide selected from the group consisting of $Nb_2O_5$, $TiO_2$ and $ZrO_2$. The protective conformal layer substantially coats the surface of the support substrate and is configured to substantially prevent structural degradation of the surface area of the support substrate within the hydrothermal reaction environment.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1C:
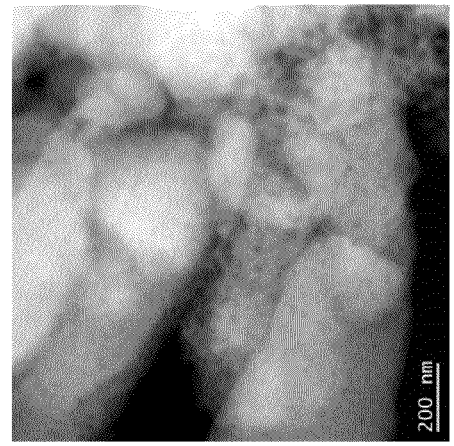
FIGS. 1C and 1D show STEM images of the SBA-15 support substrate of FIGS. 1A and 1B following exposure to a hydrothermal environment at 473 K, 400 psi Ar in $H_2O$ and illustrate structural collapse of the substrate.

The present invention pertains to improved catalytic support systems and methods for preparing the improved catalytic support systems. In various embodiments, an improved catalytic support system comprises a thin conformal coating of a material over a high surface area catalytic substrate such as a mesoporous catalytic support. As used herein, a high surface area substrate is characterized by a porous material with a surface area of between about 10 $m^2$/gram and 1,000 $m^2$/gram. The methods for preparing the catalytic supports systems use ALD to deposit various precursor materials on the support substrate to form a thin conformal coating over the high surface area substrate. The thin coatings may be deposited monolayer by monolayer to a desired film thickness. In this context, monolayer is defined as the quantity of metal species deposited by one self-terminating reaction of the ALD metal precursor with the support surface. The thin conformal coating substantially covers the exposed surface of the support substrate, limiting the exposure of the support substrate to process reactants and conditions. By mitigating exposure to process reactants and conditions the high surface area features of the support substrate may be substantially maintained during the course of the reaction and the life of the catalytic system may be extended.

The thin coating may comprise a material that is chemically robust and/or resistant to reaction process conditions, relative to the high surface area substrate material. The attributes of thin coating may be selected based on the support structure material and the reaction that will be carried out by the catalyst system. The thin coating of the chemically robust material provides the protection to the support structure, which substantially maintain the structural integrity of the support substrate and mitigates attack and/or degradation of the support substrate under the conditions of the catalytic process and reaction environment. For example, a catalyst system may be provided with a conforming layer that substantially prevents hydrothermal attack of the substrate support. By preserving the structural integrity of the support substrate, the high surface area of the catalytic support structure is maintained and in turn the catalytic activity of the system is substantially maintained over an extended catalytic reaction period relative to an unprotected catalytic support under similar reaction conditions.

In addition to providing structural protection to the catalytic support substrate, the thin coating material may also be a catalytically active material with respect to the reaction. Accordingly, a catalytic system can comprise a catalytic support substrate with a thin layer of a single material that provides both structural integrity enhancement to the catalytic support and serves as the catalyst material for the desired reaction. In other embodiments, the system may comprise a catalytic support with a thin layer of a first material that provides the structural integrity enhancement to the support structure and a thin layer of a second material that is catalytically active with respect to the reaction or that provides a promotion or enhancement effect on catalytically active nanoparticles, clusters, or monatomic species in contact with the thin layer. In yet further embodiments, a plurality of thin layers may be applied where each layer provides either structural enhancing effects, catalytic activity, promotion or enhancement effects and/or a combination thereof.

Various materials may be used for the conformal thin coating and may be selected based on reaction, reaction conditions and the catalytic support material. For example, various metal oxides that are used as catalytic materials may be used. Various metal nitride and metal sulfide materials can also be used for the conformal thin coatings. A chemically robust catalytic metal oxide material such as niobium oxide may be used as a single film that provides structural protection for the catalyst support and catalytic activity. For instance, in a particular catalytic system, a conformal layer of niobium oxide is provided on a high surface area SBA-15 support substrate. By way of further examples, catalytic systems comprising SBA-15 support substrates are also provided with a conformal layer of zirconium oxide and in another instance a conformal layer of titanium oxide. The catalytic systems may be generalized to other conforming layer materials, in particular, conforming layers of other transition metal oxides. Likewise, the catalytic systems may further be generalized to other high surface area catalytic support structures, including other mesoporous silica substrates, including MCM-41.

The conformal coating on the support substrate may be a thin layer. In various embodiments, the conformal coating layer may be several nanometers thick to a fraction of a nanometer in thickness. For example, and as described more fully below, various catalyst systems with a niobium oxide conformal coating on the surface of a SBA-15 support substrate were prepared. In these systems, the niobium oxide layer was controlled to have average thickness between 0.1 nm to 1.2 nm for various samples. In various embodiments, the coating is applied one monolayer at a time. Accordingly, high control of the coating process may be achieved to produce a conformal coating without detrimentally reducing substrate pore diameter and pore volume. The conformal coating protects the surface of the support material and its structure, including the pore geometry of the substrate. Thus, the high surface area and porosity of the support substrate is retained and the catalytic activity can be maintained under various reaction conditions and environments, including hydrothermal conditions. In another embodiment of the invention, the coating thickness is controlled to intentionally reduce the diameter of the pores in the support. By reducing the pores to a precisely controlled diameter, one can exclude larger molecules from entering the pores during the catalytic process. In this way, a molecular seive capability is achieved that provides additional selectivity to the catalysts.

Catalyst systems that have a conformal coating of a greater thickness may also be constructed. The thickness of the coating may be defined based on various considerations, including catalyst loading, retention of the surface area of the support substrate, fabrication requirements, and long-term performance of the catalyst system. In various embodiments, high catalytic performance—comparable to commercial catalyst systems—and long-term structural stability may be achieved with relatively a thin conforming layer. For example, high catalytic performance and long-term structural stability may be achieved with a niobium oxide conforming layer over an SBA-15 substrate that results from as few as four ALD cycles. Moreover, once the conforming layer achieves a minimum threshold thickness, structural integrity and overall system performance is unexpectedly independent of the thickness of the conforming layer.

An ALD process is used to prepare various embodiments of the catalytic systems. A substantially conforming coating on the surface of a high surface area substrate support is formed using ALD. An ALD process utilizes alternating exposures of chemical vapor precursors to deposit materials in a mono-layer-by-monolayer fashion on a substrate. The ALD process can provide uniformity of the coating layer, including on nanoporous and mesoporous substrate materials, for example, a mesorporous silica support substrate. The ALD process can also provide control over the thickness and composition of the conformal coating. In particular, precursor exposure times and process temperatures may be varied, as generally known in the art, to achieve the desired conformal coating.

Various embodiments of the present methods use an ALD process to deposit a thin conformal coating on a catalytic support substrate. To form metal oxide coatings, appropriate metal-containing coating precursors and oxygen-containing precursors are applied to the support substrate, such as a SBA-15 catalyst support, using ALD. The resulting metal oxide coatings are deposited over the surface of the substrate and substantially conform to the shape of the support substrate, penetrating the porous structure of the substrate. To form the corresponding metal nitrides, and metal sulfides, appropriate coating precursors containing nitrogen, and sulfur, respectively, are applied to the support following the metal-containing precursor. In general, the support substrate is first exposed to a chemical vapor precursor containing the desired metal atom (e.g., niobium pentethoxide). Second, the substrate is purged with an inert gas (e.g., nitrogen) to remove any unreacted precursor as well as gaseous reaction byproducts. Third, the substrate is exposed to a vapor of an oxygen-containing chemical precursor (e.g., water, hydrogen peroxide, ozone, nitrous oxide, oxygen) to form the corresponding metal oxide, a nitrogen containing precursor (e.g. ammonia, hydrazine, substituted hydrazines such as 1,1-dimethylhydrazine) to form the corresponding metal nitride, or sulfur-containing chemical precursors (e.g. hydrogen sulfide) to form the corresponding metal sulfide. The support substrate may then again be purged with inert gas.

For catalyst systems where multiple thin layers are applied, the ALD cycle is repeated multiple times to deposit a multilayer film of material. For catalyst systems with different coating materials, different precursors can be combined in specific sequences to deposit a mixed-coating with a controlled atomic composition. Various substrate preparation steps may also be undertaken prior to the ALD process to prepare the high surface area substrate for the ALD. Additionally, post-ALD process steps may be carried out on the conformally coated substrate. For example, in various embodiments, the coated substrate is annealed. The annealing process may enhance the protective characteristics of the thin conformal coating and may reduce the number of ALD cycles needed in order to achieve structural enhancement under reaction environment conditions. The annealing temperature and time may be adjusted to optimize these considerations. For instance, various high surface area silica substrates with a niobium oxide conformal coating may be annealed at a temperature between about 300° C. and about 500° C. for a period from about 30 minutes to about 120 minutes.

By way of example, in various embodiments, a more chemically robust material, relative to the support substrate, such as niobium oxide layer is deposited on the surface of the support substrate by ALD using a niobium precursor, niobium pentethoxide, and an oxidizing precursor, water. The substrate is first heated to a deposition temperature (e.g., 200° C.). The substrate is exposed to the first niobium pentethoxide metal precursor for a predetermined time (e.g., 480 seconds), followed by a nitrogen gas purge for a predetermined time (e.g., 240 seconds), then the substrate is exposed to the oxygen-containing precursor (water) for a second predetermined time (e.g., 480 seconds), followed by a nitrogen gas purge for a predetermined time (e.g., 240 seconds). This sequence comprises one ALD cycle for niobium oxide deposition. The ALD cycle is repeated until the desired thickness and/or loading of niobium oxide conformal coating over support substrate is achieved. For example, various samples with a niobium oxide conformal coating over a SBA-15 substrate were prepared using 1, 4, 10, 19 and 30 ALD cycles, achieving coating thicknesses from 0.1 nm to 1.2 nm. The ALD process is readily extended to other precursor materials, including titanium, zirconium, and other transition metals.

The coated support catalytic systems prepared via ALD exhibit catalytic activity comparable with that of current commercial systems. Further, the coated catalytic systems exhibit significantly improved structural stability following exposure to hydrothermal conditions relative to uncoated systems. The conformal coating protects the support substrate from attack, substantially maintaining the surface area and porosity features of the system. Thus, long-term catalytic performance is maintained under adverse reaction conditions and environments. For example, the reactivity of a catalyst system with a SBA-15 support substrate and a conformal niobium oxide coating maintains high reactivity of 2-propanol dehydration per surface area to propylene even after hydrothermal treatment of the catalyst system. While commercial niobia catalyst loses substantial surface area following hydrothermal treatment at 473 K. On the other hand, the conformally coated niobium oxide catalyst systems exhibit high surface area retention under the same reaction conditions.

EXAMPLES

The following non-limiting examples are presented to illustrate the present invention and to assist one of ordinary skill in making and using the same. The examples are not intended in any way to otherwise limit the scope of the invention.

Example 1

Hydrothermal Stability Study of uncoated SBA-15.

Figure 1D:
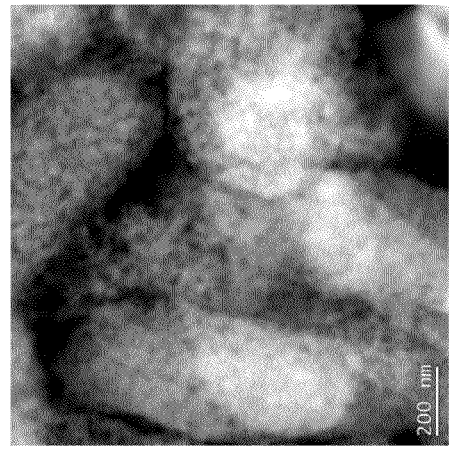
Figure 1A:
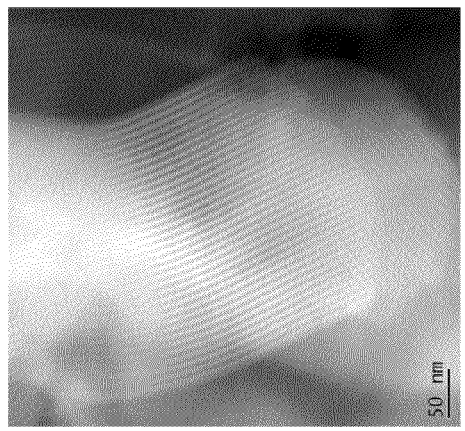
FIGS. 1A and 1B show scanning transmission electron microscope (STEM) images of an uncoated SBA-15 catalytic support substrate with a surface area of 959 $m^2$/gram, a pore diameter of 5.9 nm, and a pore volume of 1.117 $cm^3$/gram.
Figure 1B:
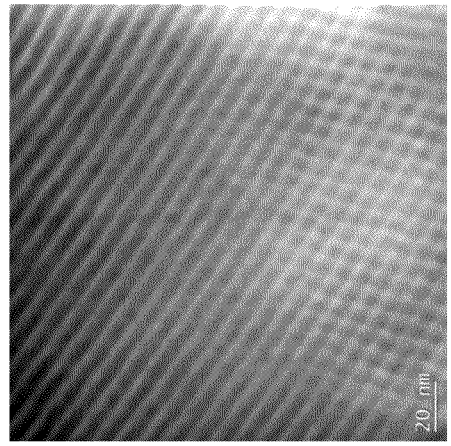

The hydrothermal stability of uncoated SBA-15 was evaluated. The SBA-15 support substrate had a surface area of 959 $m^2$/gram, a pore diameter of 5.9 nm (as obtained from BJH of the adsorption isotherms), and a pore volume of 1.117 $cm^3$/gram. FIGS. 1A and 1B show STEM images of the SBA-15 support substrate. The depicted support substrate exhibits hexagonally ordered mesopores that have a wall thickness of from about 4 nm to about 6 nm.

A portion of the SBA-15 sample support substrate was exposed to a first hydrothermal condition of 403 K, 400 psi Ar in $H_2O$. Following exposure to first hydrothermal condition, the sample had a surface area of 470 $m^2$/gram, a pore diameter of 8.8 nm, and a pore volume of 1.016 $cm^3$/gram. Another portion of the SBA-15 support substrate samples was exposed to a second hydrothermal condition of 473 K, 400 psi Ar in $H_2O$. Following exposure to the second hydrothermal condition, the sample had a surface area of 30 $m^2$/gram, pore diameter could not be measured due to pore feature collapse, and a pore volume of 0.738 $cm^3$/gram. Structural collapse of the substrate was observed following exposure to the second hydrothermal condition. FIGS. 1C and 1D show STEM images of the SBA-15 support substrate after the second hydrothermal condition.

Example 2

Hydrothermal Stability Study of SBA-15-ALD-1C-$Nb_2O_5$.

Figure 2C:
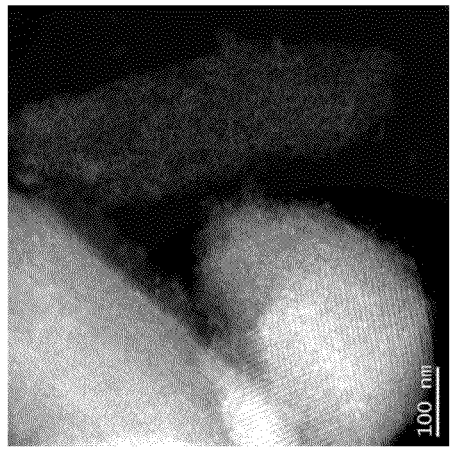
FIGS. 2C and 2D show STEM images of the catalyst support of FIGS. 2A and 2B following exposure to a hydrothermal environment.
Figure 2D:
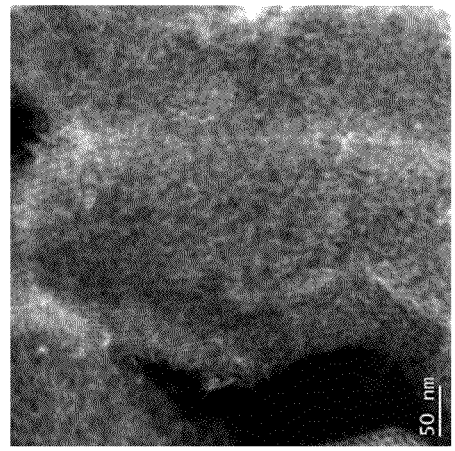
Figure 2A:
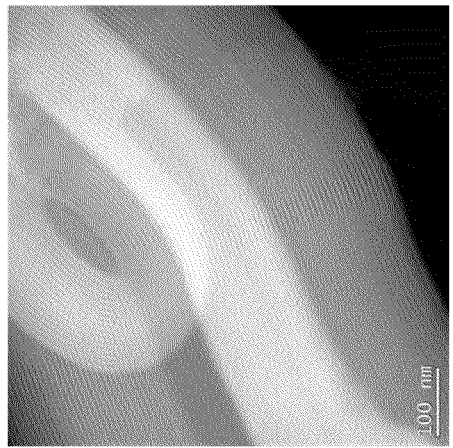
FIGS. 2A and 2B show STEM images of the catalyst support of FIG. 1A following 1 ALD cycle forming a niobium oxide conformal coating of about 12 wt %, with a surface area of 599 $m^2$/gram, a pore diameter of 5.8 nm, and a pore volume of 0.882 $cm^3$/gram.
Figure 2B:
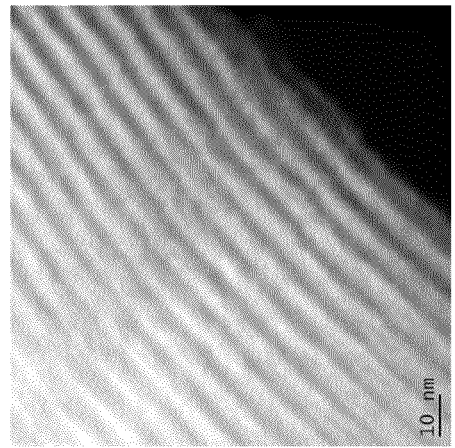

A catalytic support system comprising the SBA-15 support substrate described in Example 1 was prepared with a coating of niobium oxide using ALD. The catalytic system was prepared by heating the substrate to 200° C. in air for 30 minutes. Next the substrate was placed into the ALD reactor and heated to 200° C. under 1.2 Torr of ultrahigh purity nitrogen at a mass flow rate of 200 sccm for 10 minutes. The substrate underwent a single ALD cycle. The ALD cycle included exposure of the substrate to a niobium pentethoxide precursor for 480 seconds at a partial pressure of 1-2 mTorr. The substrate was purged with nitrogen for 240 seconds, which was followed by an exposure of the substrate to water vapor for 480 seconds at a partial pressure of 20 mTorr, and then the substrate was purged again with nitrogen for 240 seconds. The resulting conformally coated catalyst system had a niobium oxide loading of about 8 wt %, a surface area of 599 $m^2$/gram, a pore diameter of 5.8 nm, and a pore volume of 0.882 $cm^3$/gram. FIGS. 2A and 2B show STEM images of the sample.

The catalyst support system was evaluated under the first hydrothermal condition (400 K) described in Example 1 ("first hydrothermal condition"). Following the first hydrothermal condition exposure, the samples had a surface area of 541 m²/gram, a pore diameter of 6.8 nm, and a pore volume of 0.749 cm³/gram. A second set of the support substrate samples was exposed to the second hydrothermal condition (473 K) described in Example 1 ("second hydrothermal condition"). The second samples had a surface area of 328 m²/gram, a pore diameter of 9.1 nm, and a pore volume of 0.539 cm³/gram following the hydrothermal treatment. FIGS. 2C and 2D show STEM images of the sample after the second hydrothermal condition. The STEM images show the support substrate retains regions of structure and some disordered regions are present. An energy dispersive X-ray analysis (EDS) indicated that the structured regions contained 8 wt % niobium oxide and disordered regions 1 wt % niobium oxide.

Example 3

Hydrothermal Stability Study of SBA-15-ALD-4C-$Nb_2O_5$.

Figure 3C:
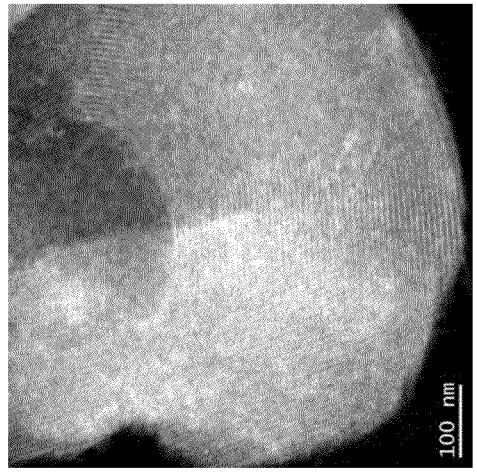
FIGS. 3C and 3D show STEM images of the catalyst support of FIGS. 3A and 3B following exposure to a hydrothermal environment.
Figure 3D:
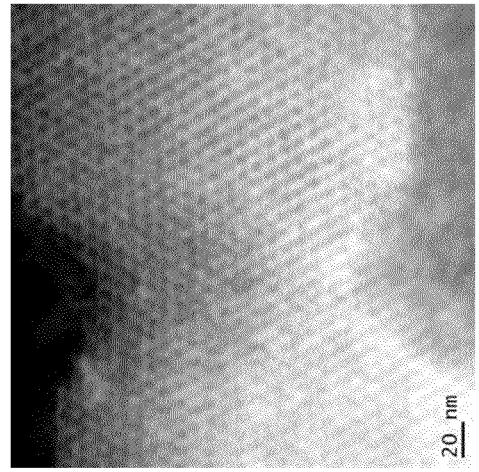
Figure 3A:
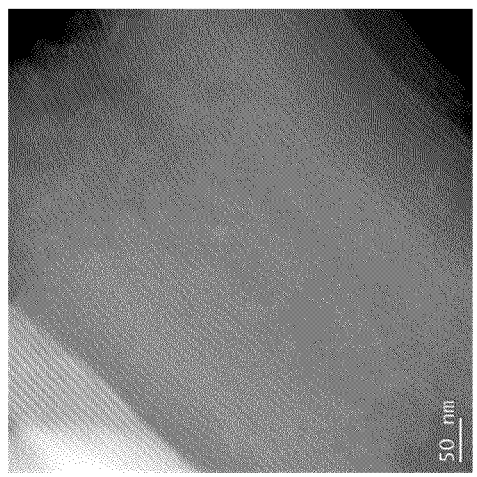
FIGS. 3A and 3B show STEM images of the catalyst support of FIG. 1A following 4 ALD cycles forming a niobium oxide conformal coating of about 33 wt %, with a surface area of 351 $m^2$/gram, a pore diameter of 5.7 nm, and a pore volume of 0.626 $cm^3$/gram.
Figure 3B:
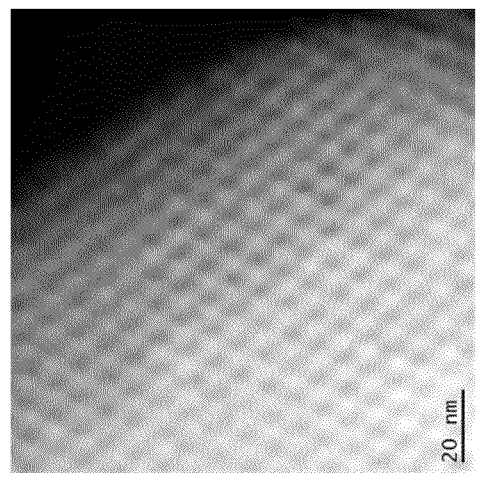

A catalytic support system comprising the SBA-15 support substrate described in Example 1 was prepared with a coating of niobium oxide using four ALD cycles using the ALD cycle described in Example 2. The resulting catalyst system had a niobium oxide loading of about 28 wt %, a surface area of 351 m²/gram, a pore diameter of 5.7 nm, and a pore volume of 0.626 cm³/gram. FIGS. 3A and 3B show STEM images of the coated sample.

The catalyst support system was evaluated under the first hydrothermal condition. Following exposure to the first hydrothermal condition, a first set of samples had a surface area of 415 m²/gram, a pore diameter of 6.3 nm, and a pore volume of 0.685 cm³/gram. A second set of coated support substrate samples was exposed to the second hydrothermal condition. Following the second exposure, the second samples had a surface area of 351 m²/gram, a pore diameter of 7.4 nm, and a pore volume of 0.638 cm³/gram. FIGS. 3C and 3D show STEM images of the sample following exposure to the second hydrothermal condition and depict an intact substrate structure. Additionally, the sample retained its surface area following the second hydrothermal condition. An EDS analysis following treatment indicated an overall loading of niobium oxide of about 26 wt %. In various embodiments, four ALD cycles of niobium oxide represents a minimum number of layers to substantially retain the high surface area structural features of the SBA-15 support structure and niobium oxide loading.

Example 4

Hydrothermal Stability Study of SBA-15-ALD-1C-$Nb_2O_5$-annealed.

Figure 4C:
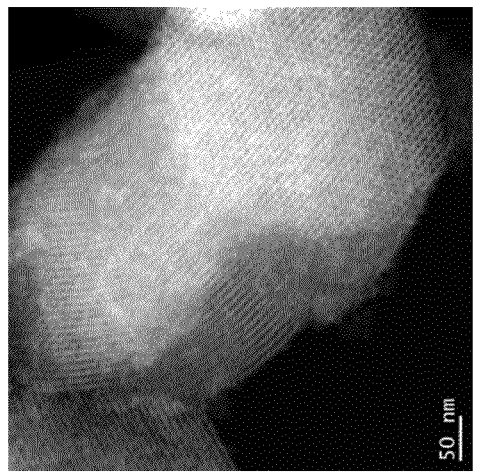
FIGS. 4C and 4D show STEM images of the catalyst support of FIGS. 4A and 4B following exposure to a hydrothermal environment.
Figure 4D:
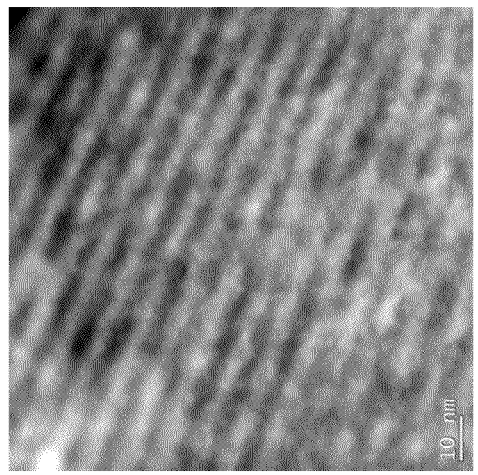
Figure 4A:
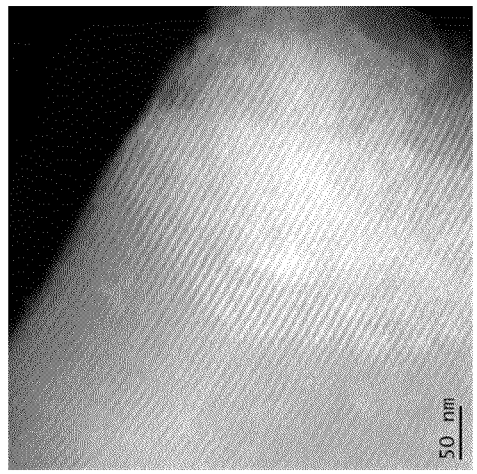
FIGS. 4A and 4B show STEM images of the catalyst support of FIG. 1A following 1 ALD cycle forming a niobium oxide conformal coating of about 16 wt %, and annealed at a temperature of 450° C. with a surface area of 514 $m^2$/gram, a pore diameter of 5.8 nm, and a pore volume of 0.653 $cm^3$/gram.
Figure 4B:
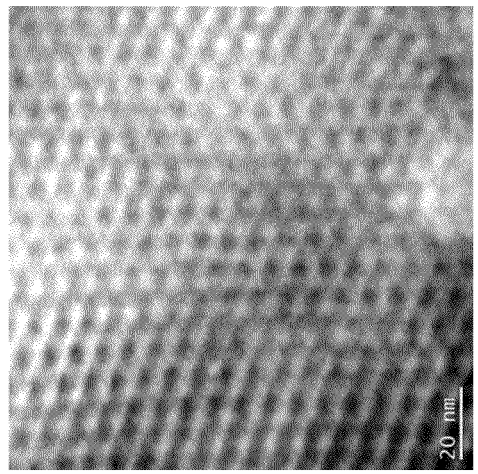

A catalytic system comprising the SBA-15 support substrate described in Example 1 was prepared with a coating of niobium oxide using one ALD cycle as described in Example 2. Prior to the one ALD niobium oxide cycle, the sample was first annealed at a temperature of 450° C. for a period of 90 minutes in 0.2 Ton oxygen. The resulting catalyst system had a niobium oxide loading of about 16 wt %, a surface area of 514 m²/gram, a pore diameter of 5.8 nm, and a pore volume of 0.653 cm³/gram. FIGS. 4A and 4B show STEM images of the prepared sample.

The resulting catalyst support system was evaluated under the second hydrothermal condition. Following exposure to the second hydrothermal condition, the prepared samples had a surface area of 438 m²/gram, a pore diameter of 8.0 nm, and a pore volume of 0.851 cm³/gram. FIGS. 4C and 4D show STEM images of the sample after exposure to the second hydrothermal condition and depict a mainly ordered structure with a few disordered regions. An EDS analysis of the sample following hydrothermal exposure indicated that the sample retained an overall loading of niobium oxide of about 16 wt %.

Examples 6

Hydrothermal Stability Studies of SBA-15-ALD-10C-$Nb_2O_5$, SBA-15-ALD-19C-$Nb_2O_5$ and SBA-15-ALD-3C-$Nb_2O_5$.

Figure 5C:
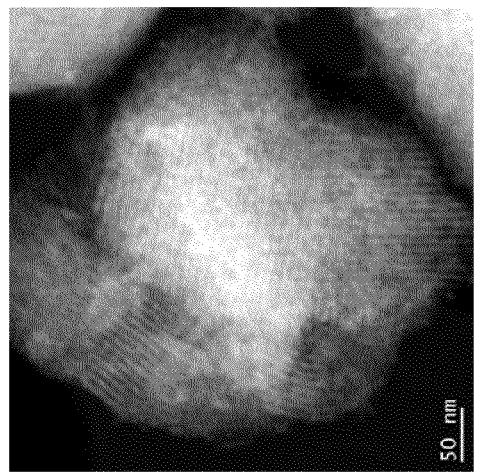
FIGS. 5C and 5D show STEM images of the catalyst support of FIGS. 5A and 5B following exposure to a hydrothermal environment.
Figure 5D:
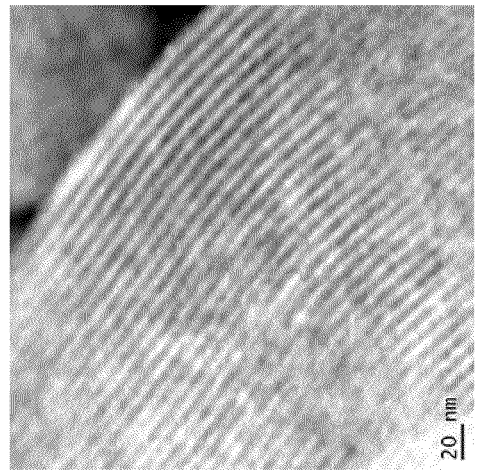
Figure 5A:
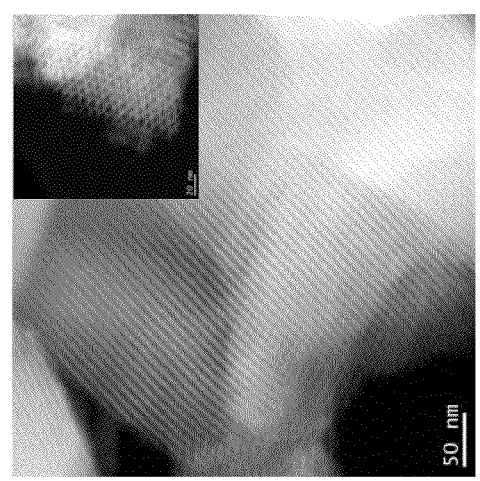
FIGS. 5A and 5B show STEM images of the catalyst support of FIG. 1A following 10 ALD cycles forming a niobium oxide conformal coating of about 47 wt %, with a surface area of 311 $m^2$/gram, a pore diameter of 5.8 nm, and a pore volume of 0.492 $cm^3$/gram.
Figure 5B:
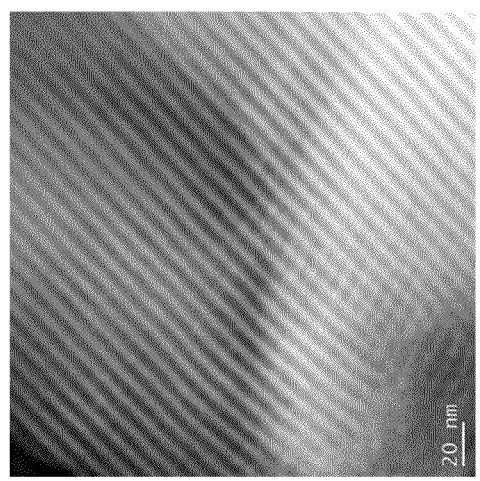
Figure 6A:
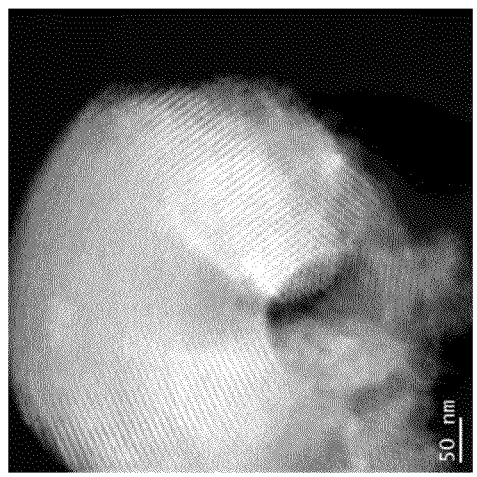
FIGS. 6A and 6B show STEM images of the catalyst support of FIG. 1A following 19 ALD cycles forming a niobium oxide conformal coating of about 55 wt %, with a surface area of 246 $m^2$/gram, a pore diameter of 5.6 nm, and a pore volume of 0.322 $cm^3$/gram.
Figure 6B:
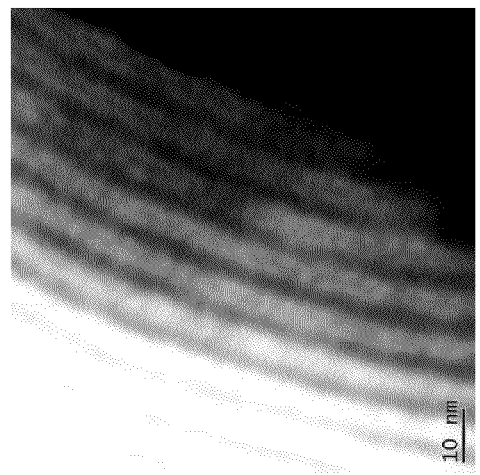
Figure 7D:
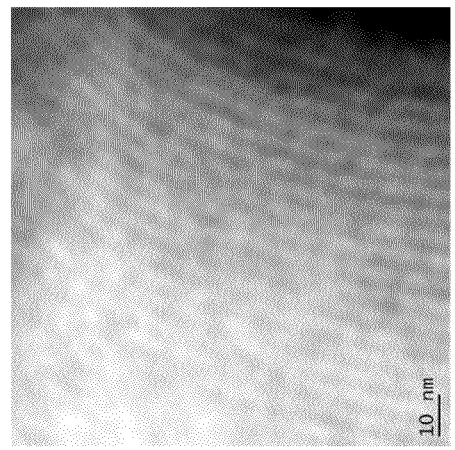
FIGS. 7C and 7D show STEM images of the catalyst support of FIGS. 7A and 7B following exposure to a hydrothermal environment.
Figure 7C:
Figure 7B:
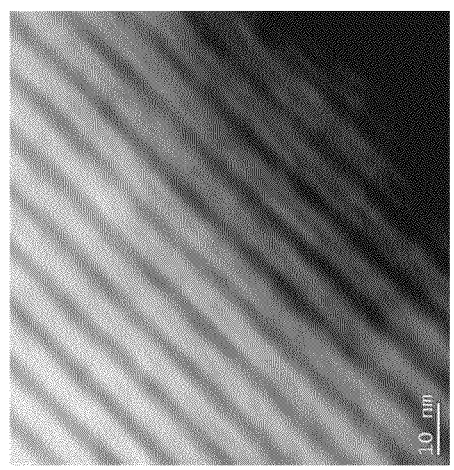
FIGS. 7A and 7B show STEM images of the catalyst support of FIG. 1A following 30 ALD cycles forming a niobium oxide conformal coating of about 67 wt %, with a surface area of 126 $m^2$/gram, a pore diameter of 5.1 nm, and a pore volume of 0.160 $cm^3$/gram.
Figure 7A:
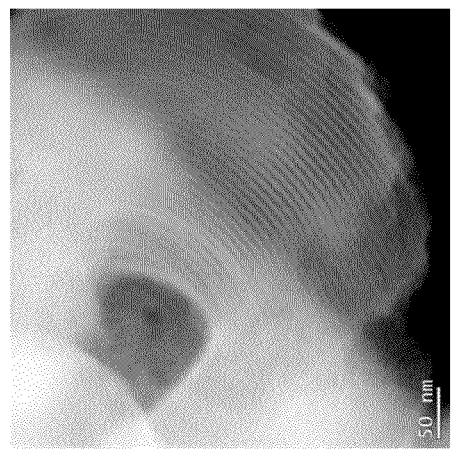

A series of catalytic support systems comprising the SBA-15 support substrate described in Example 1 with a coating of niobium oxide were prepared using the ALD cycle described in Example 2. The conformally coated prepared samples included: 10 ALD cycles (SBA-15-ALD-10C-$Nb_2O_5$), 19 ALD cycles (SBA-15-ALD-19C-$Nb_2O_5$), and 30 ALD cycles (SBA-15-ALD-30C-$Nb_2O_5$). Table 1 summarizes the physical properties of the coated catalyst supports systems. STEM images of the the various samples were prepared, with FIGS. 5A and 5B showing sample SBA-15-ALD-10C-$Nb_2O_5$, FIGS. 6A and 6B showing SBA-15-ALD-19C-$Nb_2O_5$, and FIGS. 7A and 7B showing SBA-15-ALD-30C-$Nb_2O_5$.

Figure 6C:
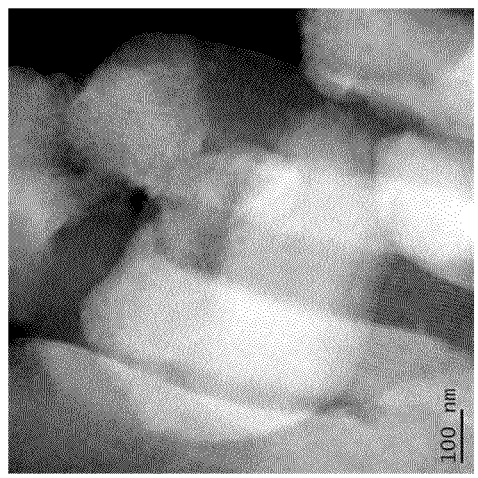
FIGS. 6C and 6D show STEM images of the catalyst support of FIGS. 6A and 6B following exposure to a hydrothermal environment.
Figure 6D:
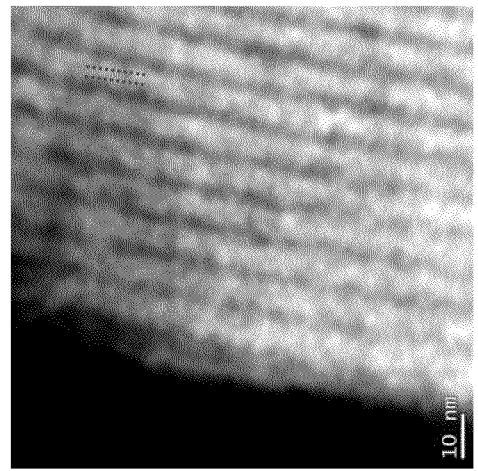

A portion of the above catalyst system samples were evaluated under the first hydrothermal condition. A second portion of the support substrates samples were exposed to the second hydrothermal condition. Table I summarizes the physical properties of the catalyst support systems following the first hydrothermal condition and the second hydrothermal condition. STEM images of the samples following the second hydrothermal condition were prepared, with FIGS. 5C and 5D showing sample SBA-15-ALD-10C-$Nb_2O_5$, FIGS. 6C and 6D showing SBA-15-ALD-19C-$Nb_2O_5$, and FIGS. 7C and 7D showing SBA-15-ALD-30C-$Nb_2O_5$.

Example 7a

Steam Stability Study of SBA-15-ALD-4C-$Nb_2O_5$.

The catalytic support system prepared per Example 3 was exposed to a steam environment. The sample had a surface area of 503 m²/gram and a pore diameter of 5.7 nm. The coated sample was first calcined in air at 500° C. for 3 hours, resulting in a surface area of 473 m²/gram and a pore diameter of 6.1 nm. Portions of the sample were treated under a normal steam condition of 500° C., 0.5 ml/hr water and air at 0.2-0.3 SCFH. The samples exhibited a surface area of 442 m²/gram representing a 6.5% reduction in surface area and a pore diameter of 6.3 nm following treatment. A second portion of the samples were treated under an extreme steam condition of 500° C., 1.5 ml/hr water and air at 0.2-0.3 SCFH. The second portion of samples exhibited a surface area of 438 m²/gram representing a 7.4% reduction in surface area and a pore diameter of 6.4 nm following treatment.

Example 7b

Steam Stability Study of SBA-15.

The SBA-15 support without the ALD niobium oxide treatment was exposed to a steam environment. The sample had a surface area of 831 m²/gram. The sample were treated under a normal steam condition of 500° C., 0.5 ml/hr water and air at 0.2-0.3 SCFH. The sample exhibited a surface area of 618 m²/gram following treatment representing a large 26% loss of surface area compared to a surface area reduction of only 6.5% for the ALD treated sample.

TABLE I

| Sample | ALD Cycles | $Nb_2O_5$ (wt %) | Hydrotherm Treatment Temp. (K) | Surface Area ($m^2/g$) | Pore Diameter (nm)* | Pore Diameter (nm)** | Mesopor Volume ($cm^3/g$) |
|---|---|---|---|---|---|---|---|
| SBA-15 | — | — | — | 959 | 5.9 | 5.5 | 1.117 |
|  |  |  | 403 | 470 | 8.8 | 7.7 | 1.016 |
|  |  |  | 473 | 30 | — | — | 0.738 |
| SBA-15-ALD-1C—$Nb_2O_5$ | 1 | 8 | — | 599 | 5.8 | 5.4 | 0.882 |
|  |  |  | 403 | 541 | 6.8 | 6.1 | 0.749 |
|  |  |  | 473 | 328 | 9.1 | 7.7 | 0.529 |
| SBA-15-ALD-4C—$Nb_2O_5$ | 4 | 28 | — | 351 | 5.7 | 5.3 | 0.626 |
|  |  |  | 403 | 415 | 6.3 | 5.4 | 0.685 |
|  |  |  | 473 | 351 | 7.4 | 5.9 | 0.638 |
| SBA-15-ALD-10C—$Nb_2O_5$ | 10 | 47 | — | 311 | 5.8 | 5.3 | 0.492 |
|  |  |  | 403 | 356 | 6.1 | 5.3 | 0.524 |
|  |  |  | 473 | 263 | 6.3 | 5.3 | 0.452 |
| SBA-15-ALD-19C—$Nb_2O_5$ | 19 | 55 | — | 246 | 5.6 | 4.8 | 0.322 |
|  |  |  | 403 | 281 | 5.4 | 4.6 | 0.372 |
|  |  |  | 473 | 294 | 5.8 | 5.1 | 0.450 |
| SBA-15-ALD-30C—$Nb_2O_5$ | 30 | 67 | — | 126 | 5.1 | 4.0 | 0.160 |
|  |  |  | 403 | 195 | 5.0 | 3.6 | 0.220 |
|  |  |  | 473 | 158 | 4.5 | 3.9 | 0.202 |
| SBA-15-ALD-1C—$Nb_2O_5$-AN (annealed) | 1 | 16 | — | 514 | 5.8 | 5.3 | 0.653 |
|  |  |  | 473 | 438 | 8.0 | 7.1 | 0.851 |

*Pore diameters obtained from Barret-Joyner-Halenda (BJH) of the adsorption isotherms
**Pore diameters obtained from BJH of the desorption isotherms

Example 8

Hydrothermal Stability Study of SBA-15-ALD-4C-$ZrO_2$.

A catalytic support system comprising the SBA-15 support substrate described in Example 2 was prepared with a conformal coating of zirconium oxide using ALD. The catalytic system was prepared by heating the substrate to 200° C. in air for 30 minutes. Next the substrate was placed into the ALD reactor and heated to 200° C. under 1.2 Torr of ultrahigh purity nitrogen at a mass flow rate of 200 sccm for 10 minutes. The substrate underwent four ALD cycles. Each ALD cycle included exposure of the substrate to the tetrakis(dimethylamino) zirconium precursor for 360 seconds at a partial pressure of 30 mTorr. The substrate was then purged with nitrogen for 240 seconds. The substrate was then exposed to water vapor for 360 seconds at a partial pressure of 20 mTorr and purged again with nitrogen for 240 seconds. This treatment resulted in a zirconium oxide loading of 23 wt %. The resulting catalyst support system had a surface area of 610 $m^2$/gram, a pore diameter of 5.7 nm, and a pore volume of 0.715 $cm^3$/gram.

The catalyst system was evaluated under the second hydrothermal condition of Example 1. Following exposure to the second hydrothermal condition, the sample had a surface area of 155 $m^2$/gram and exhibited complete collapse of the pore structure.

Example 9

Hydrothermal Stability Study of SBA-15-ALD-4C-$TiO_2$.

A catalytic support system comprising the SBA-15 support substrate described in Example 1 with a coating of titanium oxide was prepared using ALD. The catalytic system was prepared by heating the substrate to 200° C. in air for 30 minutes. Next the substrate was placed into the ALD reactor and heated to 200° C. under 1.2 Torr of ultrahigh purity nitrogen at a mass flow rate of 200 sccm for 10 minutes. The substrate underwent a four ALD cycles. Each ALD cycle included exposure of the substrate to the titanium tetrachloride precursor for 360 seconds at a partial pressure of 30 mTorr. The substrate was then purged with nitrogen for 240 seconds and followed by an exposed to water vapor for 360 seconds at a partial pressure of 20 mTorr, and purged again with nitrogen for 240 seconds. This treatment resulted in a titanium oxide loading of 34 wt % The resulting support catalyst system had a surface area of 391 $m^2$/gram, a pore diameter of 5.9 nm, and a pore volume of 0.547 $cm^3$/gram.

The catalyst system was evaluated under the second hydrothermal condition of Example 1. Following exposure to the second hydrothermal condition, the sample had a surface area of 257 $m^2$/gram, a pore diameter of 10.7 nm, and a pore volume of 0.636 $cm^3$/gram. Some collapse of the pore structure was observed.

Example 10

2-Propanol Dehydration studies

Samples of niobium oxide coated SBA-15 catalyst support systems prepared per Examples 3 and 5 and exposed to the second hydrothermal condition were evaluated for reactivity for dehydration of 2-propanol. The reactivity of commercially available niobia catalyst (HY-340) before and after hydrothermal treatment was also evaluated. Reactions for all samples were performed at 453 K, 1 atm, and 100 mg of the respective catalyst.

The activity in the dehydration of 2-propanol of the HY-340 catalyst prior exposure to the second hydrothermal condition was compared to SBA-15-ALD catalyst. The HY-340 catalyst was found to change from an amorphous to a crystalline structure after hydrothermal treatment and the surface area decreased from 118 $m^2$/g to 17$m^2$/g. The SBA-15-ALD catalyst prepared using 4, 10 and 19 ALD cycles were found to have comparable activities to commercial niobia HY-340 after hydrothermal treatment for 2-propanol dehydration per surface area to propylene. The HY-340 material is 20 times more active per surface area for the dehydration of 2-propanol to diisopropyl ether in relation to the SBA-15-ALD samples. Accordingly, differences in activity towards propylene versus diisopropyl ether formation may be a function of sites present on the material. Table II summarizes the results of the reactivity studies.

TABLE II

| Catalyst | Surface Area (m²/g) | Propylene Formation Rate (μmol/min · g) | Diisopropyl Ether Formation Rate (μmol/min · g) | Propylene Formation Rate (μmol/min · m²) | Diisopropyl Ether Formation Rate (μmol/min · m²) |
|---|---|---|---|---|---|
| HY-340 | 118 | 109 | 723 | 0.9 | 6.1 |
| HY-340-HT-473 K | 17 | 30 | 1388 | 1.8 | 82 |
| SBA-15-ALD-4C-$Nb_2O_5$-HT-473K | 351 | 455 | 1263 | 1.3 | 3.6 |
| SBA-15-ALD-10C-$Nb_2O_5$-HT-473K | 263 | 335 | 1398 | 1.3 | 5.3 |
| SBA-15-ALD-19C-$Nb_2O_5$-HT-473K | 294 | 360 | 1253 | 1.3 | 4.2 |
| SBA-15-ALD-30C-$Nb_2O_5$-473K | 158 | 83 | 1406 | 0.5 | 8.9 |

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method for preparing using atomic layer deposition (ALD) a catalyst system for carrying out a chemical reaction in a reaction environment detrimental to the structural integrity of a catalytic support structure of the catalyst system, comprising:
    providing a catalyst substrate comprising a mesoporous catalytic support structure having a plurality of pores;
    providing a first precursor, the first precursor comprising at least one metal;
    providing a second precursor, the second precursor comprising an oxygen-containing compound, a nitrogen-containing compound, or a sulfur-containing compound;
    depositing on the catalyst substrate a protective conformal layer and having a selected thickness and substantially coating the catalyst substrate wherein the protective conformal layer stabilizes the catalyst substrate to thereby provide hydrothermal stability and maintains the surface area and the porosity of the catalyst substrate within the reaction environment for the reaction and comprising at least one metal oxide, nitride, or sulfide characterized by a chemical resistance to the reaction environment greater than the support structure, the protective conformal layer deposited by performing a plurality of ALD cycles using the ALD reactor, each ALD cycle comprising alternately exposing the catalyst substrate to the first precursor and the second precursor, the method applied to provide the selected thickness being a threshold thickness wherein structural integrity and overall performance of the catalyst system is independent of further increased thickness of the thin conformal layer beyond the threshold thickness; and
    depositing at least one additional layer selected from the group of nanoclusters, clusters and a monotonic species having a catalytic activity to carry out the chemical reaction.

2. The method of claim 1, wherein the protective conformal layer is characterized by a resistance that maintains the surface area of the catalyst system within the reaction environment to within at least about 75 percent of the pre-reaction surface area.

3. The method of claim 1, further comprising reducing the diameter of the plurality of pores by selecting the number of ALD cycles to obtain a reduced pore diameter configured to selectively exclude from the plurality of pores at least one reactant in the reaction environment, and wherein the catalyst system is provided with a molecular sieve characterized by the reduced pore diameter.

4. The method of claim 1, wherein the at least one metal of the first precursor is selected from the group consisting of: Nb, Ti and Zr.

5. The method of claim 4, wherein the oxygen-containing compound is selected from the group consisting of: water vapor, $H_2O_2$, ozone, nitrous oxide, and oxygen;
    wherein the nitrogen-containing compound is selected from the group consisting of: ammonia, hydrazine, and substituted hydrazines; and
    wherein the sulfur containing compound is $H_2S$.

6. The method of claim 1, wherein the protective conformal layer is characterized by an average thickness of between about 0.1 nm and about 1.2 nm.

7. The method of claim 1, wherein the catalyst system comprises a mesoporous silica support structure and a $Nb_2O_5$ protective conformal layer deposited by performing between about 1 and about 30 ALD cycles.

8. The method of claim 7, wherein the reaction environment comprises a hydrothermal environment.

9. The method of claim 1, further comprising depositing an additional metal oxide, metal nitride, or metal sulfide on the catalyst substrate by performing at least one ALD cycle alternately exposing the catalyst substrate to a third precursor and a fourth precursor, wherein the additional metal oxide alters at least one of the catalytic activity and the resistance to the reaction environment of the catalytic system.

* * * * *

UNITED STATES PATENT AND TRADEMARK OFFICE
CERTIFICATE OF CORRECTION

PATENT NO. : 8,741,800 B2  
APPLICATION NO. : 12/841805  
DATED : June 3, 2014  
INVENTOR(S) : Jeffrey W. Elam et al.

Page 1 of 1

It is certified that error appears in the above-identified patent and that said Letters Patent is hereby corrected as shown below:

In the Specification

Column 1, under STATEMENT OF GOVERNMENT INTEREST, Line 11, please add:

--In addition, this invention was made with government support under grant number 0520527 awarded by the National Science Foundation. The government has certain rights in this invention.--

Signed and Sealed this  
Third Day of February, 2015

Michelle K. Lee  
*Deputy Director of the United States Patent and Trademark Office*